United States Patent
Logan et al.

(10) Patent No.: US 12,289,133 B2
(45) Date of Patent: Apr. 29, 2025

(54) DEVICES TO MITIGATE POLARIZATION MODE DISPERSION

(71) Applicant: RANOVUS INC., Kanata (CA)

(72) Inventors: Dylan Logan, Ottawa (CA); Kyle Murray, Fuerth (DE)

(73) Assignee: RANOVUS INC., Kanata (CA)

( * ) Notice: Subject to any disclaimer, the term of this patent is extended or adjusted under 35 U.S.C. 154(b) by 273 days.

(21) Appl. No.: 17/979,362

(22) Filed: Nov. 2, 2022

(65) Prior Publication Data
US 2023/0155682 A1 May 18, 2023

Related U.S. Application Data

(60) Provisional application No. 63/280,666, filed on Nov. 18, 2021.

(51) Int. Cl.
*G02B 6/00* (2006.01)
*H04B 10/2569* (2013.01)

(52) U.S. Cl.
CPC .............. *H04B 10/2569* (2013.01)

(58) Field of Classification Search
CPC ............ H04B 10/2569; H04B 10/6151; H04B 10/614; G02B 6/278; G02B 6/00
See application file for complete search history.

(56) References Cited

U.S. PATENT DOCUMENTS

| | | | |
|---|---|---|---|
| 10,367,598 B2 * | 7/2019 | Testa ................... | H04B 10/548 |
| 10,591,672 B2 | 3/2020 | Van Thourhout et al. | |
| 2005/0244092 A1 | 11/2005 | Mimura et al. | |
| 2019/0354460 A1 * | 11/2019 | Yamamoto .......... | G06F 11/0766 |

* cited by examiner

*Primary Examiner* — Jennifer Doan
(74) *Attorney, Agent, or Firm* — PERRY + CURRIER INC.

(57) ABSTRACT

Devices to mitigate polarization mode dispersion are provided. An example device comprises: an input coupler configured to receive an optical signal comprising a first portion in a first polarization mode and a second portion in a second polarization mode, the second polarization mode about perpendicular to the first polarization mode; an output and/or an optical detector; and one or more optical components configured to convey the optical signal from the input coupler to the output and/or optical detector, one or more of the input coupler and the optical component(s) introducing a total differential group delay between the first and second portions. The optical component(s) comprising: a rotating component configured to rotate the first polarization mode of the first portion to the second polarization mode and rotate the second polarization mode of the second portion to the first polarization mode, to adjust the total differential group delay.

8 Claims, 2 Drawing Sheets

DEVICES TO MITIGATE POLARIZATION MODE DISPERSION

BACKGROUND

Optical receivers for telecommunication systems, and the like, are generally configured to receive optical signals that have a random polarization, such that symbols (e.g. binary data) may be encoded on one, or both, of a TE (transverse electric) polarization mode or a TM (transverse magnetic) polarization mode. However, between an input coupler and an optical detector at the optical receiver, the polarization modes of the optical signal may travel at different rates (e.g. the TE polarization mode may travel slower than the TM polarization mode), and hence a time delay may be introduced between the polarization modes. Such a time delay may cause the TE and TM polarization modes to arrive at the optical detector at different times, which may lead to intersymbol interference and hence errors in detecting the optical signal.

BRIEF DESCRIPTION OF THE SEVERAL VIEWS OF THE DRAWINGS

For a better understanding of the various examples described herein and to show more clearly how they may be carried into effect, reference will now be made, by way of example only, to the accompanying drawings in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Optical receivers for telecommunication systems, and the like, are generally configured to receive optical signals that have a random polarization, such that symbols (e.g. binary data) may be encoded on one, or both, of a TE (transverse electric) polarization mode or a TM (transverse magnetic) polarization mode. However, between an input coupler and an optical detector at the optical receiver, the polarization modes of the optical signal may travel at different rates (e.g. the TE polarization mode may travel slower than the TM polarization mode), a phenomenon known as polarization mode dispersion, and hence a time delay may be introduced between the polarization modes. Such a time delay may cause the TE and TM polarization modes to arrive at the optical detector at different times, which may lead to intersymbol interference and hence errors in detecting the optical signal.

For example, the optical detector is understood to detects intensity of the optical signal and does not distinguish between polarization modes. Hence when a "1" and an adjacent "0", for example in an order of "1" followed by "0", are encoded on both the TE and TM polarization modes, for example as different intensity levels, and the "0" encoded in the TM polarization mode arrives at the optical detector the same time as the "1" encoded in the TE polarization mode (e.g. the "1" encoded in the TM polarization mode having previously arrived at the optical detector), the optical detector will generally detect an intensity corresponding to a value between "0" and "1" (e.g., as the optical detector detects an intensity that is the sum of the TE and TM polarization modes), leading to an error in detection known as intersymbol interference.

In particular, polarization mode dispersion may be acute in photonic integrated circuits (PICs) comprising, for example, silicon-on-insulator (SOI) devices.

Hence, provided herein is a device, and in particular an optical receiver, which receives an optical signal comprising a first portion in a first polarization mode (e.g. a TE polarization mode) and a second portion in a second polarization mode (e.g. a TM polarization mode), perpendicular to the first polarization mode. As the optical signal arrives at the device, there may be no polarization mode dispersion and/or minimal polarization mode dispersion such that encoding on both the polarization modes is aligned. The device includes an input coupler and an optical detector, such as a photodiode, and the device is generally configured to convey the optical signal from the input coupler to the optical detector for detection. The first and second polarization modes are understood to travel through the device at different rates (e.g. the aforementioned polarization mode dispersion). For example, the TE polarization mode may travel through SOI PIC devices slower than the TM polarization mode.

As such, the device includes a rotating component configured to rotate the first polarization mode of the first portion to the second polarization mode, and rotate the second polarization mode of the second portion to the first polarization mode, to adjust a total differential group delay between the portions. For example, as the first portion is conveyed through the device in the first polarization mode and then is inverted and/or rotated by the rotating component to the second polarization mode, and as the second portion is conveyed through the device in the second polarization mode and then is inverted and/or rotated by the rotating component to the first polarization mode, a total differential group delay between the first portion and the second portion may be adjusted due to the rotation.

In particular, a differential group delay between the polarization modes may initially be zero upon entering the input coupler. The term "differential group delay" as used herein is understood to refer to a relative delay between the first portion and the second portion introduced by respective components of the device through which the optical signal is conveyed; hence a given differential group delay may be for a particular component of the device. Furthermore, the term "total differential group delay" as used herein is understood to refer to a total difference in differential group delay between the first portion and the second portion introduced by all the components of the device through which the optical signal is conveyed. Hence, a total differential group delay may comprise a sum of respective differential group delays of all the components of the device through which the optical signal is conveyed.

Furthermore, units for differential group delays and/or total differential group delays may be on the order of microseconds and/or nanoseconds, and the like, and may be relative to an initially faster portion of an optical signal. For example, if a first portion of an optical signal is in a TE polarization mode, and a second portion of the optical signal is in a faster TM polarization mode, a differential group delay for the optical signal being conveyed through an optical component may be positive, as the differential group delay may comprise a value, in time, that the second portion moves ahead of the first portion while the optical signal is conveyed through the optical component. However, a differential group delay for the optical signal being conveyed through an optical component may be negative when the second portion is inverted to the slower TE polarization mode and the first portion is inverted to the faster TM polarization mode, as the differential group delay, in this example, may comprise a value, in time, that the second portion falls behind of the first portion while the optical signal is conveyed through the optical component.

Furthermore, the term "inverted" as used herein with respect to a polarization mode is understood to refer to converting a first polarization mode to a second polarization mode that is perpendicular to the first polarization mode. Hence, for example, a TE polarization mode may be inverted by a rotating component, as provided herein, to a TM polarization mode and, conversely, a TM polarization mode may be inverted by a rotating component, as provided herein, to a TE polarization mode.

In particular, as the optical signal is conveyed through the device, for example using optical waveguides, respective differential group delays may be introduced between the first polarization mode and the second polarization mode by the input coupler and the optical waveguides. For example, such respective differential group delays may be introduced by one or more of the input coupler, a first optical waveguide from the input coupler to the rotating component and a second optical waveguide from the rotating component to the optical detector, as well as the rotating component. However, the optical waveguides may be optional, and respective differential group delays may be introduced primarily by the input coupler and the rotating component. Indeed, each respective component of the device, through which the optical signal is conveyed, may introduce a respective differential group delay; furthermore, the rotating component rotates and/or inverts the polarization modes of the two portions of the optical signal, and introduces a respective differential group delay therebetween to compensate for the differential group delays of the other components of the device through which the optical signal is conveyed. For example, if the first portion in the first polarization mode is initially slower than the second portion in the second polarization mode, after the rotating component, the first portion in the second polarization mode is faster than the second portion in the first polarization mode. As such, the rotating component may invert the differential group delay between the first portion and the second portion so that the total differential group delay, as the first portion and the second portion enters the optical detector, is zero, and/or a given value.

In some examples, the rotating component comprises a polarization rotator which is located at a position in the device, relative to the input coupler and the optical detector, selected to adjust the total differential group delay to about zero, and/or to a given value, in combination with the rotating component rotating the polarization modes. The location of the rotating component may be selected by selecting respective lengths of a first optical waveguide from the input coupler to the rotating component and a second optical waveguide from the rotating component to the optical detector. Put another way, the rotating component is located at a position at the device such that both the portions of the optical signal are conveyed through the device partially in a first, slower, polarization mode and partially in a second, faster, polarization mode, such that the differential group delays between the portions balance to about zero and/or to a given value.

In other examples, the rotating component may comprise a pair of polarization splitter rotators that are joined by a pair of intermediate optical waveguides of different lengths. A first polarization splitter rotator splits the optical signal into two portions having respective polarization modes (e.g. TE and TM polarization modes). The first polarization splitter rotator further rotates a polarization mode of one of the two portions into the other polarization mode (e.g. the TM polarization mode is rotated to the TE polarization mode) so that the two portions are in the same polarization mode. The splitting and the rotating may occur in any suitable order and/or concurrently. A first portion of the optical signal, having a polarization mode that is initially "behind" (e.g. delayed in time) a polarization mode of a second portion, is conveyed to a shorter intermediate optical waveguide, and the second portion, having a polarization mode that is initially "ahead"" (e.g. ahead in time) of a polarization mode of a first portion, is conveyed to a longer intermediate optical waveguides. The difference in length between the intermediate optical waveguides generally brings a total differential group delay to zero and/or to given value. A second polarization splitter rotator receives the two portions and rotates a polarization mode of the first portion, while not rotating the polarization mode of the second portion; the result is that the first portion and the second portion are in respective polarization modes opposite to what they were upon entering the device. The second polarization splitter rotator further combines the first portion and the second portion (e.g. the rotating and combining occurring in any suitable order). The first portion and the second portion are conveyed to the optical detector. As with the polarization rotator, the combination of the PSRs and the pair of intermediate optical waveguides of different lengths, both invert the polarization mode of each of the first portion and the second portion, and introduce a differential group delay that assists in adjusting the total differential group delay for the device to about zero and/or to a given value.

An aspect of the present specification provides a device comprising: an input coupler configured to receive an optical signal comprising a first portion in a first polarization mode and a second portion in a second polarization mode, the second polarization mode about perpendicular to the first polarization mode; one or more of an output and an optical detector; and one or more optical components configured to convey the optical signal from the input coupler to one or more of the output and the optical detector, one or more of the input coupler and the one or more optical components introducing a total differential group delay between the first portion and the second portion, the one or more optical components comprising: a rotating component configured to rotate the first polarization mode of the first portion to the second polarization mode and rotate the second polarization mode of the second portion to the first polarization mode, to adjust the total differential group delay.

An aspect of the present specification provides a device comprising: an input coupler having a first differential group delay value; a first optical waveguide coupled to the input coupler, the first optical waveguide having a second differential group delay value; a rotating component coupled to the first optical waveguide, the rotating component configured to: rotate a first polarization mode to a second polarization mode perpendicular to the first polarization mode; and rotate the second polarization mode to the first polarization mode; the rotating component having a third differential group delay value; a second optical waveguide coupled to the rotating component, the second optical waveguide having a fourth differential group delay value; and one or more of an output and an optical detector coupled to the second optical waveguide, the second differential group delay value and the fourth differential group delay value dependent on respective lengths of the first optical waveguide and the second optical waveguide, the respective lengths selected such that a total differential group delay value of the input coupler, the first optical waveguide, the rotating component and the second optical waveguide is one or more of about zero and a given value.

An aspect of the present specification provides a device comprising: an input coupler; one or more of an output and an optical detector; a first polarization splitter rotator (PSR) in optical communication with the input coupler; a second PSR in optical communication with one or more of the output and the optical detector; and a pair of intermediate optical waveguides that optically couple the first PSR and the second PSR, the pair of intermediate optical waveguides being of different lengths, the first PSR configured to: split an optical signal from the input coupler into a first portion having a first polarization mode and a second portion having a second polarization mode, perpendicular to the first polarization mode; rotate the second polarization mode to the first polarization mode such that both the first portion and the second portion are in the first polarization mode; and convey the first portion and the second portion to respective optical waveguides of the pair of intermediate optical waveguides, the different lengths between the pair of intermediate optical waveguides adjusting a differential group delay between the first portion and the second portion, the second PSR configured to: rotate the first polarization mode of the first portion to the second polarization mode such that the first portion is in the second polarization mode and the second portion is in the first polarization mode; combine the first portion and the second portion; and output the first portion and the second portion towards one or more of the output and the optical detector.

Figure 1:
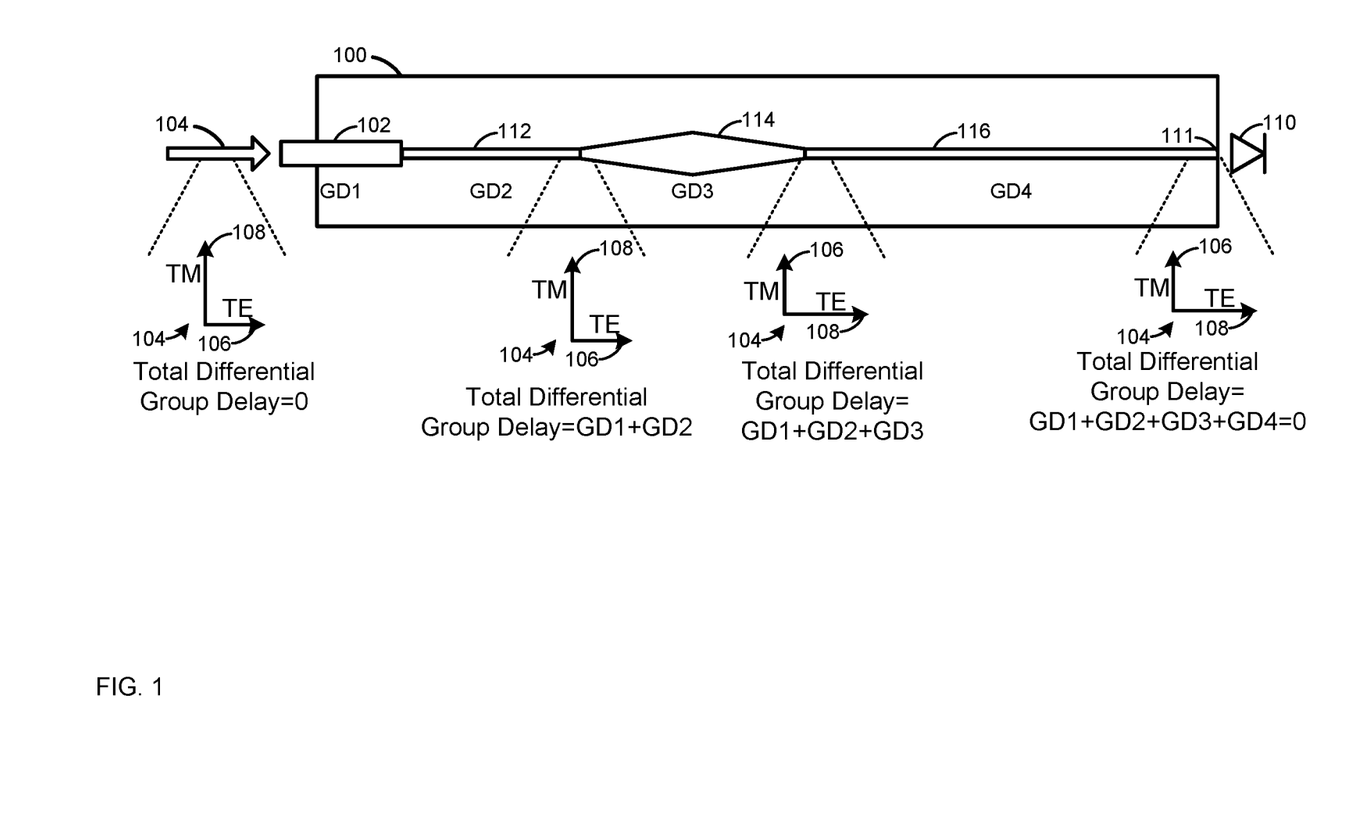
FIG. 1 is a device to mitigate polarization mode dispersion, in accordance with some examples.

Attention is hence directed to FIG. 1 which depicts a device 100 to mitigate polarization mode dispersion. The device 100 generally comprises an optical receiver photonic integrated circuit (PIC) fabricated using SOI, however the device 100 may comprise any suitable combination of materials.

The device 100 generally comprises an input coupler 102 configured to receive an optical signal 104. The input coupler 102 may be any suitable optical component that may adapted to receive an optical signal and may comprise a facet, and the like, at an edge of the device 100 and/or a coupler to an optical fiber through which the optical signal 104 is being conveyed to the device 100. The optical signal 104 may be encoded with any suitable data (e.g. in a binary format), including, but not limited to, audio, video, and/or any other suitable data The optical signal 104 may comprises a first portion 106 in a first polarization mode and a second portion 108 in a second polarization mode, the second polarization mode about perpendicular to the first polarization mode. For clarity, the portions 106, 108 are depicted adjacent the optical signal 104 in FIG. 1, which is understood to comprise any suitable wavelength (and/or combination thereof) which may be compatible with optical telecommunication systems.

As the optical signal 104 enters the input coupler 102, the first polarization mode of the first portion 106 may comprise one of a TE (transverse electric) polarization mode or a TM (transverse magnetic) polarization mode, and the second polarization mode of the second portion 108 comprises an other of the TE polarization mode or the TM polarization mode. As depicted, the first polarization mode of the first portion 106 comprises the TE polarization mode and the second polarization mode of the second portion 108 comprises the TM polarization mode. This example will be used hereafter, though it is understood that the polarization modes of the portions 106, 108 may be any suitable polarization modes. Furthermore, for clarity, hereafter, when a portion 106, 108 is depicted as being left to right within a drawing, such a portion 106, 108 is understood to be in the TE polarization mode; and, similarly, hereafter, when a portion 106, 108 is depicted as being up to down within a drawing, such a portion 106, 108 is understood to be in the TM polarization mode.

Furthermore, as depicted, the polarization modes of the portions 106, 108 are understood to have a total differential group delay of about "0".

As depicted, the device 100 further comprises one or more of an output and an optical detector 110 (e.g. located at the output 111), such as a photodiode, and the like, and one or more optical components configured to convey the optical signal 104 from the input coupler 102 to the optical detector 110 and/or the output 111 of the device 100. As depicted, the optical detector 110 is located at the output 111.

However, it is understood that as the device 100 may generally comprise a photonics integrated circuit, the optical detector 110 may also a component of the photonics integrated circuit; alternatively the optical detector 110 may be adjacent to, but not part of the photonic integrated circuit. Hence, in some examples, PIC portions of the device 100, may be provided without the optical detector 100, and the optical detector 110 may later be placed adjacent the output 111. However, in other examples, the optical detector 110 may be part of the PIC portions of the device 100 (e.g. the optical detector 110 may also comprise a PIC), such that the device 100 is provided as a PIC which includes the optical detector 110 (e.g. located at the output 111 of the one or more optical components configured to convey the optical signal 104 from the input coupler 102 towards the optical portion 110).

In general, the optical detector 110 detects intensity and/or power of the optical signal 104 and does not distinguish between polarization modes of the portions 106, 108. While not depicted, the optical detector 110 is generally configured to communication with a processing device which processes output from the optical detector 110, for example, to convert data of the optical signal 104, as detected by the optical detector 110, to data that may be output and/or stored, and the like.

As depicted, the one or more optical components include a first optical waveguide 112, a rotating component 114 and a second optical waveguide 116, however the optical waveguides 112, 116 may be optional. In particular, the first optical waveguide 112 optically couples the input coupler 102 to the rotating component 114, and the second optical waveguide 116 optically couples the rotating component 114 to an output 111 at which the optical detector 110 is located. Put another way, the second optical waveguide 116 optically couples the rotating component 114 to one or more of the output 111 and the optical detector 110.

In general, one or more of the input coupler 102 and the one or more optical components (e.g. such as the optical waveguides 112, 116 and the rotating component 114) introduces a total differential group delay between the first portion 106 and the second portion 108. Put another way, all the components of the device 100 through which the optical signal 104 travels introduce respective differential group delays between the portions 106, 108, with a total differential group delay comprising a sum of the respective differential group delays.

For example, the optical signal 104 may be conveyed to the device 100 via optical fiber. While polarization mode dispersion may not generally a problem with optical fiber, as the device 100 generally comprise a PIC which may be fabricated from SOI, the input coupler 102 and the optical waveguides 112, 116, when present, introduce respective differential group delays between the TE and TM polarization modes. For example, the TE polarization mode tends to travel through SOI slower than the TM polarization mode, hence, without the rotating component 114, functionality of which is described in more detail below, a total differential group delay between the first portion 106 and the second portion 108 will be higher at the optical detector 110 than when the optical signal 104 enters the input coupler 102.

In particular, the rotating component 114 is generally configured to rotate the first polarization mode of the first portion 106 to the second polarization mode and rotate the second polarization mode of the second portion 108 to the first polarization mode, to adjust the total differential group delay. For example, as depicted, upon exiting the rotating component, the polarization modes of the first portion 106 and the second portion 108 of the optical signal 104 are rotated and/or inverted, such that the first portion 106 is in the TM polarization mode and the second portion 108 is in the TE polarization mode. Hence, put another way, the rotating component 114 is configured to invert a differential group delay between the first portion 106 and the second portion 108.

In particular, as depicted, the input coupler 102, the first optical waveguide 112, the rotating component 114, and the second optical waveguide 116 respectively introduce differential group delays (e.g. labelled "GDn" in FIG. 1 and through the present specification) of GD1, GD2, GD3, GD4, the labels "GDn" being adjacent respective components of the device 100 in FIG. 1 to indicate the respective differential group delay introduced by the components. For example, the TE mode tends to travel through SOI (e.g. of the input coupler 102, the optical waveguides 112, 116 and the rotating component 114) slower than the TM mode, each of the input coupler 102, the optical waveguides 112, 116 and the rotating component 114.

In general, the differential group delay, GD3, of the rotating component 114 is selected such that the total differential group delay is one or more of zero and a given value. For example, a total differential group delay may be defined as:

$$\text{Total\_GD} = \sum_{n=1}^{n=N} GDn = \text{Value} \qquad \text{Equation (1)}$$

For Equation (1), Total GD comprises the total differential group delay, and GDn is a respective differential group delay of an $n^{th}$ component of the device 100 through which the optical signal 104 is conveyed, and N is the total number of components of the device 100 through which the optical signal 104 travel.

The value, Value, to which the total differential group delay may be set may be zero. However, in other examples, the optical signal 104 may arrive at the device 100 with a given differential group delay, and hence the value of the total differential group delay for Equation (1) may be selected to compensate for such given differential group delay. For example, if the given differential group delay between the portions 106, 108 is not "0" (e.g. as depicted in FIG. 1) as the optical signal 104 arrives at the input coupler 102, but a value of "−Value", the total differential group delay of Equation (1) may be set to "+Value".

As depicted in FIG. 1, for N=4 (e.g. the components of the device 100 through which the optical signal 104 is conveyed includes four components including the input coupler 102, the optical waveguides 112, 116 and the rotating component 114), the total differential group delay is:

$$\text{Total}_{GD} = GD1 + GD2 + GD3 + GD4 \qquad \text{Equation (2)}$$

In general, assuming that differential group delay is defined as being relative to the second portion 108, and that the second portion 108 is initially in the TM polarization mode and travelling faster through the input coupler 102 and the first optical waveguide 112 than the first portion 106 in the TE polarization modes, the differential group delay GD1 for the input coupler 102 and differential group delay GD2 for the first optical waveguide 112 are both positive (e.g. the second portion 108 is faster than the first portion 106). A size of the differential group delays GD1, GD2 generally depend on a length of the input coupler 102 and the first optical waveguide 112. Put another way, the longer the input coupler 102 and/or the first optical waveguide 112, the greater their respective differential group delays GD1, GD2. Indeed, as depicted, as the optical signal 104 enters the rotating component, the total differential group delay is GD1+GD2.

However, as the first portion 106 and the second portion 108 have their polarization modes inverted by the rotating component 114, such that the first portion 106 in the TM polarization mode is travelling faster through the rotating component 114 and the second optical waveguide 116, the differential group delay GD4 of the second optical waveguide 116 will generally be negative, and the differential group delay GD3 of the rotating component 114 may be negative and/or reduced relative to if the polarization modes of the portions 106, 108 were not inverted.

An absolute size and/or value of the differential group delays GD3, GD4 may generally depend on a length of the rotating component 114 and the second optical waveguide 116. Put another way, the longer the rotating component 114 and the second optical waveguide 116, the greater their respective differential group delays GD3, GD4. However, an absolute size and/or value of the differential group delay GD3 of the rotating component 114 may also depend on where, within the rotating component 114, inversion of the polarization modes of the portions 106, 108 occurs; in practice, however, the differential group delay GD3 of the rotating component 114 may be predetermined via a given design of the rotating component 114.

In general, as the respective differential group delays GD1, GD2, GD4 of the input coupler 102, the first optical waveguide 112 and the second optical waveguide 116 are known and/or may be measured, a respective differential group delay GD3 of the rotating component 114 may be selected such that the total differential group delay is zero and/or a given value.

Put another way, when the device 100 is being considered for fabrication, lengths of the input coupler 102, the first optical waveguide 112 and the second optical waveguide 116 may be predetermined and/or selected for optical design purposes and/or space considerations in the device 100. Once the lengths of the input coupler 102, the first optical waveguide 112 and the second optical waveguide 116 are selected, their respective differential group delays GD1, GD2, GD4 may be determined, for example as SOI devices, and the like, may generally have well understood and/or predetermined properties such that the polarization mode dispersion of SOI devices, and the like, may be determined.

As such, the respective differential group delay GD3 of the rotating component 114 may be selected such that the total differential group delay is zero and/or any other suitable predefined value. In particular, Equation (2) may be adapted to:

$$\text{Total}_{GD} = GD1 + GD2 + GD3 + GD4 = \text{Value} \quad \text{Equation (3)}$$

In Equation (3), Value is any suitable given value for the total differential group delay which may include, but is not limited to zero.

Hence, for example, the respective differential group delay GD3 of the rotating component 114 may be selected using the given value, Value, and the respective differential group delays GD1, GD2, GD4 of the input coupler 102, the first optical waveguide 112 and the second optical waveguide 116 as follows:

$$GD3 = \text{Value} - (GD1 + GD2 + GD4) \quad \text{Equation (4)}$$

Alternatively, the differential group delay GD3 of the rotating component 114 may be fixed but of a size that may adjust the total differential group delay to zero and/or the given value, Value, presuming the respective differential group delays GD2, GD4 of the optical waveguides 112, 116 may be adjusted, for example by adjusting one or more of their respective lengths, by:

$$GD2 + GD4 = \text{Value} - (GD1 + GD3) \quad \text{Equation (5)}$$

Hence, given fixed and/or predetermined values for the respective differential group delays GD1, GD3 of the input coupler 102 and the rotating component 114, a subtotal (e.g. GD2+GD4) of the differential group delays GD2, GD4 of the optical waveguides 112, 116 and their lengths selected accordingly.

Regardless, as depicted, it is understood that the total differential group delay of the portions 106, 108 is GD1+GD2+GD3 as the optical signal 104 exits the rotating component 114, and that the total differential group delay of the portions 106, 108 is GD1+GD2+GD3+GD4 as the optical signal 104 exits the output 111 and/or enters the optical detector 110. In some examples, as depicted, the total differential group delay of the portions 106, 108 of GD1+GD2+GD3+GD4 as the optical signal 104 exits the output 111 and/or enters the optical detector 110 may be "0" and/or about "0".

Hence, it is generally understood that device 100 comprises: the input coupler 102 configured to receive the optical signal 104 comprising the first portion 106 in the first polarization mode and the second portion 108 in the second polarization mode, the second polarization mode about perpendicular to the first polarization mode; one or more of an output 111 and an optical detector 110; and one or more optical components configured to convey the optical signal from the input coupler 102 to one or more of the output 111 and the optical detector 110, one or more of the input coupler 102 and the one or more optical components introducing a total differential group delay between the first portion and the second portion, the one or more optical components comprising: the rotating component 114 configured to rotate the first polarization mode of the first portion 106 to the second polarization mode and rotate the second polarization mode of the second portion 108 to the first polarization mode, to adjust the total differential group delay. For example, the rotating component 114 may be configured to rotate the first polarization mode of the first portion 106 to the second polarization mode and rotate the second polarization mode of the second portion 108 to the first polarization mode, to adjust the total differential group delay to one or more of zero and a predetermined value.

While the one or more optical components may further comprise one or more of the optical waveguides 112, 116, one or more of the optical waveguides 112, 116 may be optional. For example, when the first optical waveguide 112 is not present at the device 100, an input to the rotating component 114 is adjacent to, and optically coupled to, an output of the input coupler 102. Similarly, when the second optical waveguide 116 is not present at the device 100, an output of the rotating component 114 is adjacent to, and optically coupled to, the output 111 of the device 100 and/or the optical detector 110.

Put another way, when the optical waveguides 112, 116 are present, it is understood that the device 100 may generally comprise: the input coupler 102 having a first differential group delay value GD1, the first optical waveguide 112 coupled to the input coupler 102, the first optical waveguide 112 having a second differential group delay value GD2; the rotating component 114 coupled to the first optical waveguide 112, the rotating component 114 configured to: rotate the first polarization mode to the second polarization mode perpendicular to the first polarization mode; and rotate the second polarization mode to the first polarization mode; the rotating component 114 having a third differential group delay value GD3; the second optical waveguide 116 coupled to the rotating component 114, the second optical waveguide 116 having a fourth differential group delay value GD4; and one or more of the output 111 and the optical detector 110 coupled to the second optical waveguide 116. It is further understood that the second differential group delay value GD2 and the fourth differential group delay value GD4 are generally dependent on respective lengths of the first optical waveguide 112 and the second optical waveguide 116, the respective lengths selected such that a total differential group delay value of the input coupler 102, the first optical waveguide 112, the rotating component 114 and the second optical waveguide 116 is one or more of about zero and a given value.

The rotating component 114 may have any suitable configuration.

For example, the rotating component 114 may comprise a polarization rotator, which is an optical device that rotates given polarization modes. In particular, such a polarization rotator rotates the respective polarization modes by 90°. Hence, for example, such a polarization rotator rotates (e.g. inverts) the TE polarization mode to the TM polarization mode, and rotates (e.g. inverts) the TM polarization mode to the TE polarization mode.

Hence, put another way, in particular examples, the rotating component 114 may comprise a polarization rotator and the one or more optical components of the device 100 may further comprise: respective optical waveguides 112, 116 between the rotating component 114 and the input coupler 102, and between the rotating component 114 and one or more of the output 111 and the optical detector 110, wherein lengths of the respective optical waveguides 112, 116 are selected to adjust the total differential group delay to one or more of about zero, and a given value, in combination with the rotating component 114 rotating the first polarization mode and the second polarization mode. Put another way, one or more of the optical waveguides 112, 116 may be optional, however, when present, their lengths are selected such that their respective differential group delays GD2, GD4, in combination with the differential group delay GD1 of the input coupler 102 and the differential group delay GD3 of the rotating component 114, adjust the total differential group delay to one or more of about zero, and a given value.

However, in other examples, the rotating component 114 may have other configurations. For example, attention is next directed to FIG. 2 which depicts another example of the device 100, with the rotating component 114 adapted to include polarization splitter rotators (PSRs) and intermediate optical waveguides therebetween. The device 100 is otherwise similar to as depicted in FIG. 1, with like components having like numbers. Again, one or more of the optical waveguides 112, 116, while present in FIG. 2, may be optional.

Figure 2:
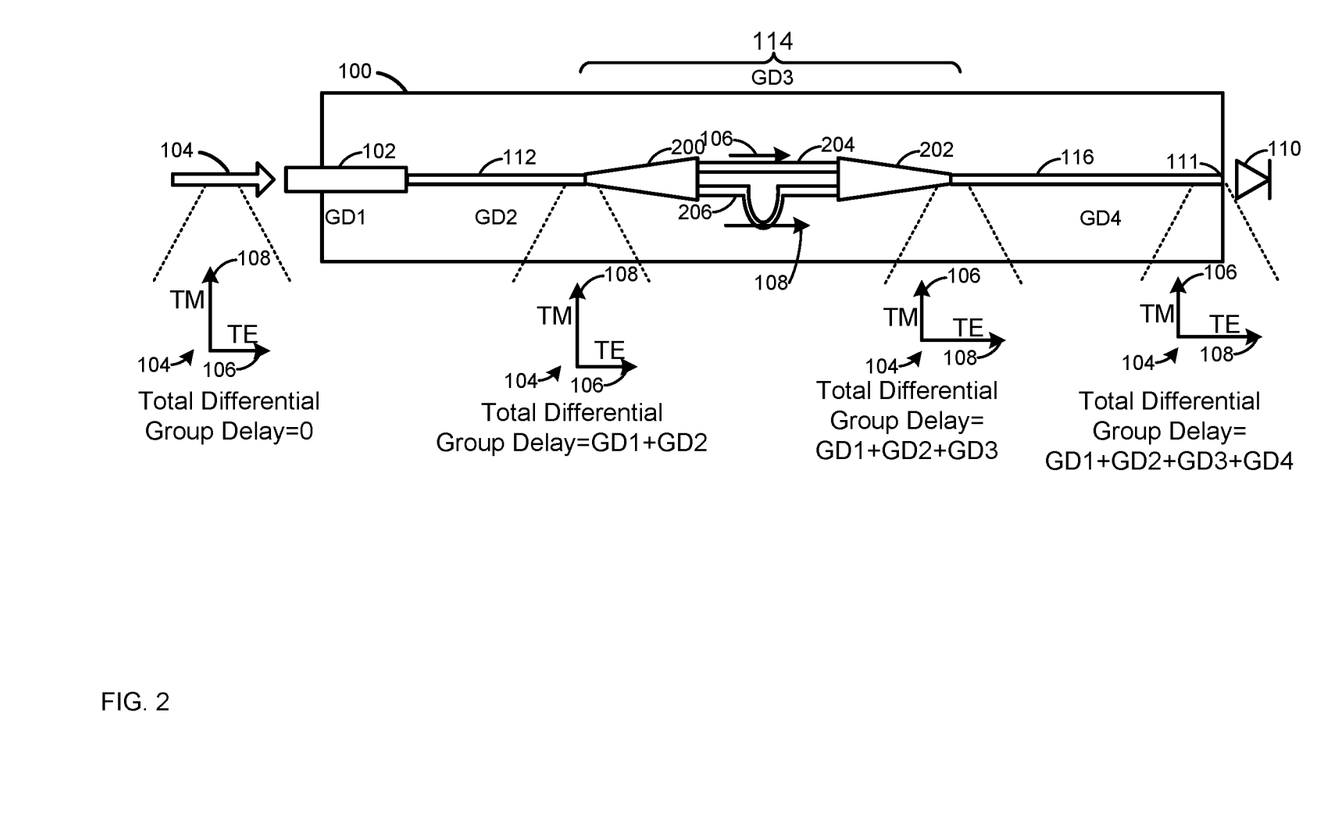
FIG. 2 is another device to mitigate polarization mode dispersion, in accordance with some examples.

In particular, as depicted in FIG. 2, the rotating component 114 comprises: a first polarization splitter rotator (PSR) 200 in optical communication with the input coupler 102 and a second PSR 202 in optical communication with the output 111 and/or the optical detector 110. As depicted, the first PSR 200 is in optical communication with the input coupler 102 via the first optical waveguide 112, and the second PSR 202 in optical communication with the output 111 and/or the optical detector 110 via the second optical waveguide 116.

As depicted, the device 100 further comprises: a pair of intermediate optical waveguides 204, 206 that optically couple the first PSR 200 and the second PSR 202, the pair of intermediate optical waveguides 204, 206 being of different lengths. For example, as depicted, a first intermediate optical waveguide 204 is shorter than a second intermediate optical waveguide 206. The optical waveguides 204, 206 are referred to herein as being "intermediate" optical waveguides 204, 206, to both distinguish the intermediate optical waveguides 204, 206 from the first optical waveguide 112 and the second optical waveguide 116, and as the intermediate optical waveguides 204, 206 are intermediate, and/or between, the PSRs 200, 202.

In general, the first PSR 200 is configured to: split the optical signal 104 into the first portion 106 and the second portion 108; rotate the second polarization mode to the first polarization mode such that both the first portion 106 and second portion 108 are in the first polarization mode; and convey the first portion 106 and the second portion 108 to respective optical waveguides 204, 206 of the pair of intermediate optical waveguides 204, 206, the different lengths of the pair of intermediate optical waveguides 204, 206 adjusting a differential group delay between the first portion 106 and the second portion 108. While such splitting and rotating are described in given order, the rotating may occur before the splitting, or the splitting may occur before the rotating; put another way, the functionality of the first PSR 200 may occur in any suitable order.

In general, the first PSR 200 conveys the portion 106, 108 having the polarization mode that is conveyed slowest through the device 100 (e.g. up to the rotating component 114), to the shorter of the intermediate optical waveguides 204, 206 (e.g. the first intermediate optical waveguide 204), and the first PSR 200 further conveys the portion 106, 108 having the polarization mode that is conveyed fastest through the device 100 (e.g. up to the rotating component 114), to the longer of the intermediate optical waveguides 204, 206 (e.g. the second intermediate optical waveguide 204). Hence, as depicted, the first portion 106, in the slower TE polarization mode, is conveyed to the first (e.g. shorter) intermediate optical waveguide 204; the second portion 108, which was originally in the faster TM polarization mode, but has been converted to the slower TE polarization mode by the first PSR 200, is conveyed to the second (e.g. longer) intermediate optical waveguide 204. As such, the differential group delay, GD3, between the first portion 106 and the second portion 108 is reduced, relative to the differential group delay between the first portion 106 and the second portion 108 as they entered the rotating component 114.

It is further understood that while for clarity the first portion 106 and the second portion 108 are depicted as adjacent respective intermediate optical waveguides 204, 206, the first portion 106 and the second portion 108 are travelling through the respective intermediate optical waveguides 204, 206.

Furthermore, the portions 106, 108 are understood to be in a same polarization mode within the intermediate optical waveguides 204, 206, and in particular in the TE polarization mode.

The second PSR 202 is generally configured to: rotate the first polarization mode of the first portion 106 to the second polarization mode such that the first portion 106 is in the second polarization mode and the second portion 108 is in the first polarization mode; combine the first portion 106 and the second portion 108; and output the first portion 106 and the second portion 108 towards one or more of the output 111 and the optical detector 110, for example via the second optical waveguide 116. While such combining and rotating are described in given order, the rotating may occur before the combining, or combining may occur before the rotating; put another way, the functionality of the second PSR 202 may occur in any suitable order.

Furthermore, while the second PSR 202 combines, and does not split, the portions 106, 108, the second PSR 202 is still referred to as a polarization "splitter" rotator as polarization splitter rotators generally split optical signals into respective polarization modes when the optical signals travel through the polarization splitter rotators in a first direction (e.g. as with the first PSR 200), but polarization splitter rotators combine separated polarization modes into one optical signal when travelling through the polarization splitter rotators in a second direction opposite the first direction. Hence, it is understood that the PSRs 200, 202 may comprise a same type of device, but the first PSR 200 is oriented relative to the first optical waveguide 112 and the pair of intermediate optical waveguides 204, 206 such that the first PSR 200 splits the optical signal 104 in the portions 106, 108, and the second PSR 202 is oriented relative to the pair of intermediate optical waveguides 204, 206 and the second optical waveguide 116 and such that the second PSR 202 combines the portions 106, 108 back into a combined optical signal 104.

Hence, in general, the second PSR 202 operates in reverse fashion relative to the first PSR 200, such that the optical signal 104, when output from the second PSR 202, is in a similar state as when output from the rotating component 114 as depicted in FIG. 1.

Furthermore, the total differential group delay of the device 100 as depicted in FIG. 2 is determined in a manner similar to as described with respect to the device 100 as depicted in FIG. 1. In particular the input coupler 102, the first optical waveguide 112, the rotating component 114 and the second optical waveguide 116 have respective differential group delays GD1, GD2, GD3, GD4, and Equation (1) and/or Equation (2) and/or Equation (3) and/or Equation (4) and/or Equation (5) may be used to select lengths of one or more of the optical waveguides 112, 116 and/or to select lengths of one or more of the intermediate optical waveguides 204, 206. In particular, while Equation (1), Equation (2), Equation (3), Equation (4), and Equation (5) are directed towards determining a total differential group delay and/or respective differential group delays, once a total differential group delay and/or respective differential group delays are determined, respective lengths of one or more of the optical waveguides 112, 116 and/or to select lengths of one or more of the intermediate optical waveguides 204, 206 may be determined based, for example, on relative speeds of the respective polarization modes through the device 100.

Furthermore, while the optical waveguides 112, 116 may be optional, the device 100 may further comprise: the respective optical waveguides 112, 116 between the rotating component 114 and the input coupler 102, and between the rotating component 114 and the optical detector 110 and/or the output 111, and the different lengths of the intermediate optical waveguides 204, 206 may be selected to adjust the total differential group delay to one or more of zero and a given value in combination with lengths of the respective optical waveguides 112, 114.

Hence, put another way, in some examples the device 100 may comprise: the input coupler; one or more of the output 111 and the optical detector 110; the first PSR 200 in optical communication with the input coupler 102; the second PSR 202 in optical communication with the output 111; and a pair of intermediate optical waveguides 204, 206 that optically couple the first PSR 200 and the second PSR 202, the pair of intermediate optical waveguides 204, 206 being of different lengths. The first PSR 200 is configured to: split the optical signal 104 from the input coupler 102 into the first portion 106 having a first polarization mode and the second portion 108 having a second polarization mode, perpendicular to the first polarization mode; rotate the second polarization mode to the first polarization mode such that both the first portion 106 and the second portion 108 are in the first polarization mode; and convey the first portion 106 and the second portion 108 to respective optical waveguides 204, 206 of the pair of intermediate optical waveguides 204, 206, the different lengths between the pair of intermediate optical waveguides 204, 206 adjusting a differential group delay between the first portion 106 and the second portion 108. The second PSR 202 is configured to: rotate the first polarization mode of the first portion 106 to the second polarization mode such that the first portion 106 is in the second polarization mode and the second portion 108 is in the first polarization mode; combine the first portion 106 and the second portion 108; and output the first portion 106 and the second portion 108 towards one or more of the output 111 and the optical detector 110.

In such examples, the device 100 may further comprise: the first optical waveguide 112 optically coupling the input coupler 102 to the first PSR 200; and the second optical waveguide 116 optically coupling the second PSR 202 to the output 111 and/or the optical detector 110.

Furthermore, one or more of the input coupler 102, the first optical waveguide 112, the second optical waveguide 116, the first PSR 200 and the second PSR 202 are understood to introduce respective differential group delays between the first portion 106 and the second portion 108, a respective differential group delay of the pair of intermediate optical waveguides 204, 206, due to the different lengths, compensating for the respective differential group delays such that a total differential group delay is one or more of about zero and a given value. Put another way, while in FIG. 2, the rotating component 114 is depicted as having a respective differential group delay GD3, such a respective differential group delay GD3 is understood to include a sum of the differential group delays of each of the PSRs 200, 202, and a respective differential group delay of the pair of the intermediate optical waveguides 204, 206. Indeed, in these examples, each of the PSRs 200, 202, and the pair of the intermediate optical waveguides 204, 206, may treated as separate components through which the optical signal 104 is conveyed, such that, for Equation (1), N=6 and differential group delays for each of the input coupler 102, the optical waveguides 112, 116, the PSRs 200, 202, and the pair of the pair of the intermediate optical waveguides 204, 206 (e.g. six components) are used for Equation (1).

It is further understood that, while herein the effect of the rotating component 114 on total differential group delay has been described, the rotating component 114 may also effect polarization dependent loss (PDL) of the first portion 106 and the second portion 108. For example, the TM polarization mode is generally more lossy than the TE polarization mode. Put another way, as a portion 106, 108 of the optical signal 104 that is in the TM polarization mode is conveyed through the device 100, a signal strength (e.g. power) of the portion 106, 108 may be reduced relative to the portion 106, 108 of the optical signal 104 that is in the TE polarization mode. However, as provided herein, the portions 106, 108 have their respective polarization modes inverted such that the first portion 106 may be conveyed though the device 100 partly in the TE polarization mode and partly in the TM polarization mode; similarly, the second portion 108 may be conveyed though the device 100 partly in the TM polarization mode and partly in the TE polarization mode. Hence, in some examples, lengths of one or more of the optical waveguides 112, 116 and/or one or more of the intermediate optical waveguides 204, 206 may be selected such that the portions 106, 108 are about equally in the TE polarization mode and the TM polarization mode as the optical signal 104 is conveyed through the device 100, In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . ." and "one or more . . ." language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A device comprising:
an input coupler configured to receive an optical signal comprising a first portion in a first polarization mode and a second portion in a second polarization mode, the second polarization mode about perpendicular to the first polarization mode;

one or more of an output and an optical detector; and one or more optical components configured to convey the optical signal from the input coupler to the one or more of the output and the optical detector, one or more of the input coupler and the one or more optical components introducing a total differential group delay between the first portion and the second portion, the one or more optical components comprising:
- a polarization rotator configured to rotate the first polarization mode of the first portion to the second polarization mode and rotate the second polarization mode of the second portion to the first polarization mode, to adjust the total differential group delay;
- a first optical waveguide between the polarization rotator and the input coupler; and
- a second optical waveguide between the polarization rotator and one or more of the output and the optical detector, wherein respective lengths of the first optical waveguide and the second optical waveguide are selected to adjust the total differential group delay to zero or another predetermined value, in combination with the polarization rotator rotating the first polarization mode and the second polarization mode.

2. The device of claim 1, wherein the first polarization mode comprises one of a TE (transverse electric) polarization mode or a TM (transverse magnetic) polarization mode, and the second polarization mode comprises an other of the TE polarization mode or the TM polarization mode.

3. The device of claim 1, wherein the polarization rotator is further configured to invert a differential group delay between the first portion and the second portion.

4. The device of claim 1, wherein the polarization rotator comprises:
- a first polarization splitter rotator (PSR) in optical communication with the input coupler;
- a second PSR in optical communication with one or more of the output and the optical detector;
- a pair of intermediate optical waveguides that optically couple the first PSR and the second PSR, the pair of intermediate optical waveguides being of different lengths, the pair of intermediate optical waveguides comprising the first optical waveguide and the second optical waveguide;
- the first PSR configured to: split the optical signal into the first portion and the second portion; rotate the second polarization mode to the first polarization mode such that both the first portion and the second portion are in the first polarization mode; and
- convey the first portion and the second portion to respective optical waveguides of the pair of intermediate optical waveguides, the different lengths of the pair of intermediate optical waveguides adjusting a differential group delay between the first portion and the second portion,
- the second PSR configured to: rotate the first polarization mode of the first portion to the second polarization mode such that the first portion is in the second polarization mode and the second portion is in the first polarization mode; combine the first portion and the second portion; and output the first portion and the second portion towards one or more of the output and the optical detector.

5. A device comprising:
- an input coupler having a first differential group delay value;
- a first optical waveguide coupled to the input coupler, the first optical waveguide having a second differential group delay value;
- a rotating component coupled to the first optical waveguide, the rotating component configured to: rotate a first polarization mode to a second polarization mode perpendicular to the first polarization mode; and rotate the second polarization mode to the first polarization mode; the rotating component having a third differential group delay value;
- a second optical waveguide coupled to the rotating component, the second optical waveguide having a fourth differential group delay value; and
- one or more of an output and an optical detector coupled to the second optical waveguide,
- the second differential group delay value and the fourth differential group delay value dependent on respective lengths of the first optical waveguide and the second optical waveguide, the respective lengths selected such that a total differential group delay value of the input coupler, the first optical waveguide, the rotating component and the second optical waveguide is one or more of about zero and a given value.

6. The device of claim 5, wherein the rotating component is further configured to invert a differential group delay between respective polarization modes rotated by the rotating component.

7. A device comprising:
- an input coupler;
- one or more of an output and an optical detector;
- a first polarization splitter rotator (PSR) in optical communication with the input coupler;
- a second PSR in optical communication with one or more of the output and the optical detector; and
- a pair of intermediate optical waveguides that optically couple the first PSR and the second PSR, the pair of intermediate optical waveguides being of different lengths,
- the first PSR configured to: split an optical signal from the input coupler into a first portion having a first polarization mode and a second portion having a second polarization mode, perpendicular to the first polarization mode; rotate the second polarization mode to the first polarization mode such that both the first portion and the second portion are in the first polarization mode; and convey the first portion and the second portion to respective optical waveguides of the pair of intermediate optical waveguides, the different lengths between the pair of intermediate optical waveguides adjusting a differential group delay between the first portion and the second portion,
- the second PSR configured to: rotate the first polarization mode of the first portion to the second polarization mode such that the first portion is in the second polarization mode and the second portion is in the first polarization mode; combine the first portion and the second portion; and output the first portion and the second portion towards one or more of the output and the optical detector.

8. The device of claim 7, further comprising:
- a first optical waveguide optically coupling the input coupler to the first PSR; and
- a second optical waveguide optically coupling the second PSR to one or more of the output and the optical detector, one or more of the input coupler, the first optical waveguide, the second optical waveguide, the first PSR and the second PSR introducing respective differential group delays between the first portion and the second portion, the differential group delay of the pair of intermediate optical waveguides, due to the different lengths, compensating for the respective differential group delays such that a total differential group delay is one or more of about zero and a given value.

* * * * *